Figure 1:
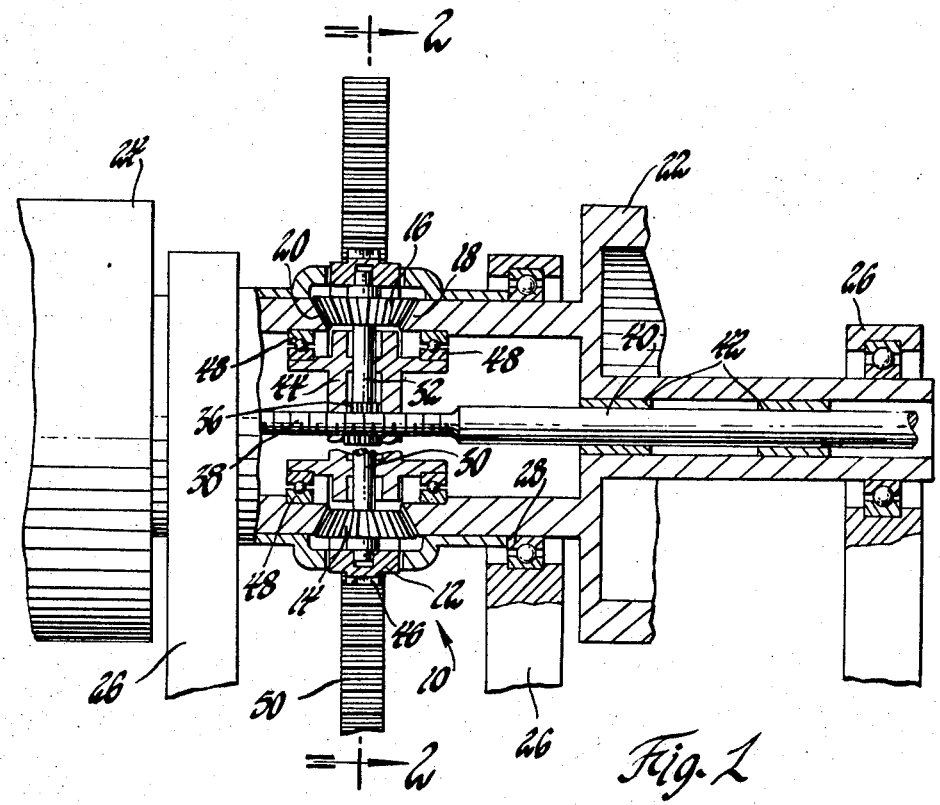
Figure 2:
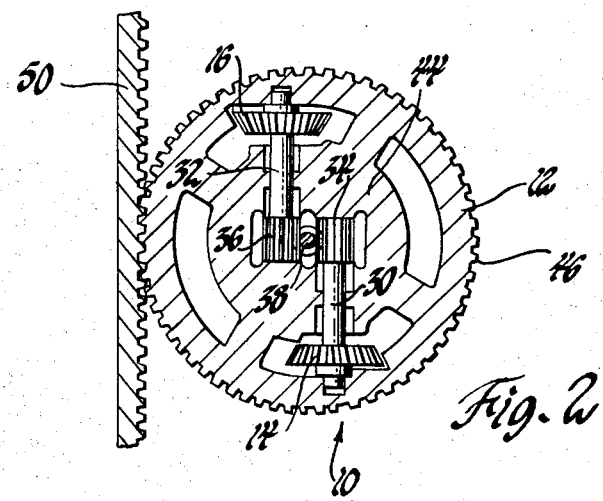

United States Patent

[11] 3,575,065

| [72] | Inventor | Nathaniel B. Kell |
| | | Indianapolis, Ind. |
| [21] | Appl. No. | 860,558 |
| [22] | Filed | Sept. 24, 1969 |
| [45] | Patented | Apr. 13, 1971 |
| [73] | Assignee | General Motors Corporation |
| | | Detroit, Mich. |

[54] DIFFERENTIAL GEARING ARRANGEMENT
2 Claims, 2 Drawing Figs.

[52] U.S. Cl. .................................................. 74/665,
74/675, 180/6.2
[51] Int. Cl. ............................................. F16h 37/06,
B62d 11/00
[50] Field of Search........................................ 74/675,
665; 180/(Inquired)

[56] References Cited
UNITED STATES PATENTS

| 2,392,556 | 1/1946 | Seppeler.................. | 74/675X |
| 2,533,610 | 12/1950 | Norelius.................. | 74/675 |
| 2,771,791 | 11/1956 | Backman.................. | 74/675 |
| 2,774,253 | 12/1956 | Minard et al. ............ | 74/675 |
| 2,782,902 | 2/1957 | Sloane..................... | 74/675X |

*Primary Examiner*—Arthur T. McKeon
*Attorneys*—W. E. Finken, A. M. Heiter and D. F. Scherer ABSTRACT: This specification describes a differential-gearing unit having two input members and two output members that are interconnected by a spur gear and bevel gear arrangement. One of the inputs engages a ring gear that drives the carrier of the bevel gearing while the other input engages a pair of spur gears that drive the pinions of the bevel gearing. Input motion of the one input results in equal unidirectional motion of the two outputs while input motion of the other input results in equal but opposite motion of the two outputs. Simultaneous motion of both inputs results in a phase change between the two outputs.

Patented April 13, 1971

3,575,065

INVENTOR.
Nathaniel B. Kell
BY
Donald L. Selerer
ATTORNEY

DIFFERENTIAL GEARING ARRANGEMENT

This invention relates to differential gearing and more particularly to differential gearing having two inputs and two outputs.

Prior art devices for producing unitary rotation of dual outputs of a differential gear set or differential rotation dual outputs of the gear set have generally included the combination of a bevel gear differential system and a planetary differential system. In these prior art devices, the inputs to the differential-gearing arrangement were generally one rotary input and one linearly input or two rotary inputs. On of the inputs drives the planetary-gearing arrangement to produce one output condition or motion and the other input would be directed to the bevel-gearing arrangement and would produce the other output motion.

The present invention provides the output motion function desired in this type of system by using a single-gearing arrangement; that is, a bevel gear differential-type gearing arrangement in which the pinions of the differential gear set are driven by one input member to provide a differential output motion and the cage or carrier of the differential gear set is driven by the other input member to provide the unidirectional output and input.

It is therefore an object of this invention to provide an improved differential-gearing arrangement having two input members and two output members operatively connected through a differential bevel-gearing arrangement for providing unidirectional output motion when one input member is moved and opposite directional output motion when the other input member is moved.

Another object of this invention is to provide a differential-gearing arrangement having a carrier member supporting a pair of bevel pinion gears and a pair of output ring bevel gears meshing with the pinion bevel gears, an externally toothed ring gear drivingly connected to the carrier member and adapted to be driven by an input gear, and a pair of spur tooth pinion gears drivingly connected to the bevel pinion gears adapted to be driven by a circular rack member.

These and other objects and advantages of this invention will be more apparent from the following description and drawings in which:

FIG. 1 is an elevational view partly in section of the differential-gearing arrangement; and FIG. 11 is a sectional view of a portion of the gearing arrangement taken along line 2-2 of FIG. 1.

Referring to the drawing wherein like characters designate like or corresponding parts, there is shown a bevel differential-gearing arrangement, generally designated 10, having a carrier or cage 12 rotatably supporting a pair of bevel pinion gears 14 and 16 which mesh with a pair of bevel ring gears 18 and 20 respectively. The ring gears 18 and 20 are secured to output drums 22 and 24 respectively which drums are rotatably supported on frame member 26 by suitable bail bearings such as 28.

The bevel pinions 14 and 16 have shafts 30 and 32 connected thereto to which are secured pinion gears 34 and 36 respectively. The pinion gears 34 and 36 mesh with a circular rack 38 which is secured to an input shaft or rod 40 which is rotatably journaled in the output drum 22 by bushings 42. The bushings 42 permit the output drum 22 to rotate relative to the input shaft 40. The shafts 30 and 32 are rotatably supported by bushings in the inner portion 44 of the carrier 12. The inner portion 44 is rotatably supported by ball bearings 48 on the bevel ring gears 18 and 20. The ring gear 46 meshes with a rack gear 50.

When the shaft 40 is not moved, the pinion gears 34 and 36 and the bevel pinion gears 14 and 16 are grounded by the circular rack 38 so that they cannot rotate about the axis of the shafts 30 and 32. If the rack 50 is moved when the shaft 40 is not moved, the ring gear 46 and the carrier 12 are rotated thereby rotating the pinion gears 34, 36, 14 and 16 about the axis of the circular rack 38. When the bevel pinion gears 14 and 16 rotate about the circular rack 38, they drive the output bevel ring gears 18 and 20 with them thereby driving the drums 22 and 24 in the same direction at the same speed.

If the rack 50 is not moved and the shaft 40 and circular rack 38 are moved linearly, the pinions 34 and 36 will be rotated by the teeth on the circular rack thereby rotating the bevel pinions 14 and 16. Since the pinions 34 and 36 rotate in opposite directions, the bevel output gears 18 and 20 and the drums 22 and 24 will be caused to rotate in opposite directions an equal amount.

If it is desired to drive the output drums 22 and 24 continuously, the rack 50 can be replaced with a drive gear which can then be driven by any rotating power source to provide continuous rotation of the drums 22 and 24. If it becomes desirable during the operation to change the phase relationship between the drums 22 and 24, the circular rack 38 can be moved linearly and this will cause a speed differential between the drums 22 and 24 thereby changing the phase relationship between the two drums.

This differential-gearing arrangement can be incorporated in a hydrostatic drive system utilizing two pumps and two motors as power transmission members. The output drums 22 and 24 would then be connected by linkage, cams or any conventional method to the hydraulic pumps to control the displacement thereof such that when the rack 50 is moved, the displacement change would be equal and in the same direction in both pumps and when the rack 38 is moved, the displacement would be equal but in opposite directions. Thus the rack 50 would provide a propulsion drive signal, that is, to establish a drive ratio in the transmission, while rack 38 would provide a steer bias in the transmission. This system could also be used in a dual conveyor drive system, wherein parallel conveyors, carrying or transporting parts to be joined or assembled at another work station where it is desirable to have the parts on the conveyors reach the work stations simultaneously. In this operation, the ring gear 46 would be continuously driven thereby driving the conveyors at the same speed. However, if the parts should become misaligned on the two conveyors, the circular rack 38 would be moved to adjust the linear relationship between the conveyors to bring the parts in synchronization at the work station.

The above description and drawings are not intended as limitations on the invention but merely as a description of the preferred embodiments.

I claim:

1. A differential-gearing arrangement comprising bevel gear means having a carrier member, a pair of bevel gears rotatably mounted on said carrier, a pair of bevel output gears meshing with said bevel gears and a ring gear secured to the outer periphery of the carrier; a pair of spur pinion gears drivingly connected to said bevel gears; a circular rack engaging said spur pinion gears; and drive means engaging said ring gear; whereby motion of said drive means will cause said output bevel gear to rotate an equal amount in one direction, and linear motion of said circular rack will cause said bevel output gears to rotate an equal amount in opposite directions.

2. A differential-gearing arrangement comprising bevel gear means having a carrier member, a pair of bevel gears rotatably mounted in said carrier, a pair of bevel output gears meshing with said bevel gears and a ring gear secured to the outer periphery of the carrier; a pair of spur pinion gears drivingly connected to said bevel gears; a circular rack engaging said spur pinion gears; and rack gear means engaging said ring gear; whereby linear motion of said rack gear means will cause said output bevel gears to rotate an equal amount in one direction, and linear motion of said circular rack will cause said bevel output gears to rotate an equal amount in opposite directions.